Patented Sept. 5, 1922.

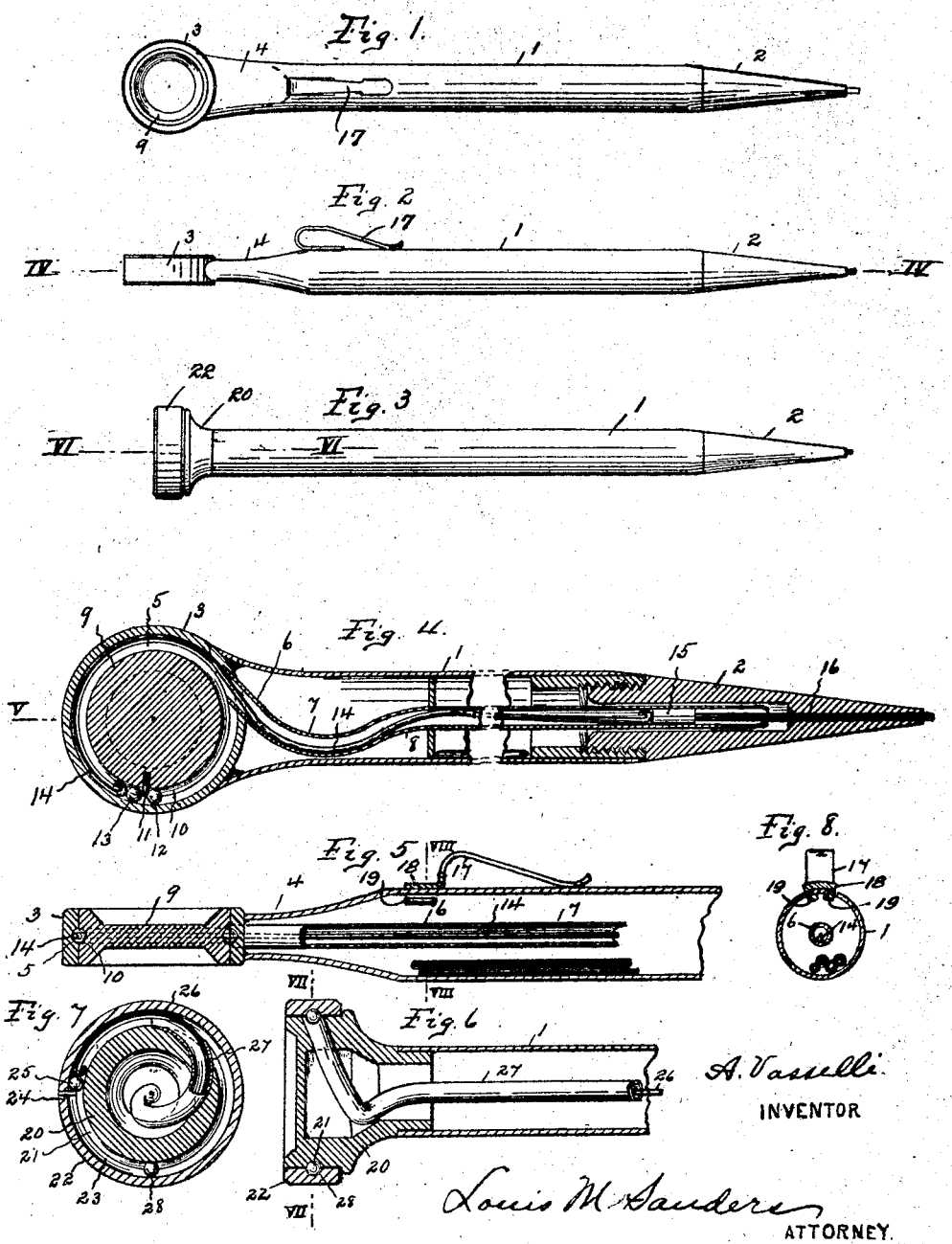

1,427,985

UNITED STATES PATENT OFFICE.

ANTHONY VASSELLI, OF NEWARK, NEW JERSEY.

MAGAZINE PENCIL.

Application filed April 2, 1921. Serial No. 458,002.

*To all whom it may concern:*

Be it known that I, ANTHONY VASSELLI, a citizen of the United States, residing in the city of Newark, county of Essex, and State of New Jersey, have invented a new and useful Improvement in Magazine Pencils, set forth in the following specification.

My invention relates to that class of pencil cases wherein the "lead" is fed from the case point by mechanism actuated by the turning of a rotating member at the head of the case. Space for spare "leads" is provided in the case body. The object of the improvement is to reduce the mechanism to the simplest possible construction, with the fewest parts consistent with effective operation and convenient manipulation; with a consequent reduction in cost of manufacture.

In the accompanying drawing, illustrating the improvement,

Fig. 1 is a plan view of the pencil case.

Fig. 2 is a side view of the same.

Fig. 3 is a side view of a modified form of case.

Fig. 4 is a longitudinal section of the modification shown in Figs. 1 and 2.

Fig. 5 is a section on line V of Fig. 4.

Fig. 6 is a longitudinal section of the modification shown in Fig. 3.

Fig. 7 is a section on line VII of Fig. 6.

Fig. 8 is a section on line VIII—VIII of Fig. 5.

Similar reference numerals refer to like parts throughout the specification and drawing.

The pencil case consists of a case body 1 of tubular form, the case point 2, detachably secured to the body 1; and the annular head 3, in which the actuating disk 9 is located. The body 1 is flattened at its upper end as at 4, and the annular head 3 is permanently secured to the end by soldering or brazing. The interior of the head 3 has the ball race 5 therein, from which through a tangential aperture therein the small tube 6 extends, said tube being bent as shown at 7 and 8. The end of the tube 6 projects into the counterbored aperture of the case point 2. Within the annular head 3 is the actuating disk 9, provided with the circumferential ball race 10, in registry with the ball race 5. The disk is provided with a radial pin 11 extending into the ball race, upon one side of which is the locking ball 12, and upon the other is the driving ball 13. With the balls 12 and 13 in the raceway between the head 3 and disk 9, the disk is locked in the head against axial displacement.

Extending longitudinally of the tube 6 is the flexible wire 14, following the curves therein and extending into the ball race between the head 3 and disk 9 until it contacts with the ball 13 which, filling the raceway, prevents the bent end of the wire from contacting the pin 11, or slipping by the same and so interfering with longitudinal movement of the wire upon the turning of the disk, as hereinafter described. In front of the wire is the plug 15, which fits the tube 6 quite snugly. The "lead" is inserted into the case point 2 as shown, and when such point is screwed into place, the lead will project into the tube 6 and into contact with the plug 15.

It will be noted that the end of the tube 6, where it extends into the head 3 is in position to act as a stop to prevent the ball 12 from passing beyond it when said ball is pushed along by the pin 11, yet the pin may pass the tube end when the ball is not in place. This affords a very simple way of assembling the parts. Let it be assumed that the case 1, head 3, and disk 9 are in place as shown, and with the case point 2 removed. The ball 12 is first dropped into the tube 6 down which it falls into the ball race. The disk 9 is then turned around to bring the pin 11 outside of the ball. The ball 13 is then dropped into the tube, then the wire 14 is inserted and pushed down into contact with the ball 13. The plug 15 is next inserted, and with the lead 16 inserted into the case point 2, the latter is screwed into place upon the body 1, with the lead 16 extending into the small tube 6 in contact with the plug 15. If the disk 9 is grasped between the thumb and finger and turned to the right, the pin 11 will push the ball 13 forward against the curled end of the wire 14, which will in turn force the plug 15 against the lead 16, and thus eject it from the point 2.

The body 1 serves as a receptacle for spare pencil leads. The clip 17 may be of the usual shape and soldered to the case 1, as shown in Figs. 1 and 2; but I prefer to form it with an extension 18, which is provided with a pair of tangs 19 for insertion through a pair of slots in the case 1, and then bent over and riveted down upon the inside of the case.

In Figs. 6 and 7, I have shown a modified form of the lead ejecting means. The hollow head 20 is secured in the end of the case body 1, as by soldering, screwing or otherwise as desired. This head is provided with an external ball race 21, from which the spiral end of the small tube 27 extends tangentially into the hollow interior of the head 20, and is curved around as shown and finally extends longitudinally of case body 1. Surrounding the head 20 is the ring 22, having the internal ball race 23, to register with the race 21. The ring has the inwardly projecting pin 24, which serves as the means for pushing the ball 25 against the end of the flexible wire 26, which latter is located within the tube 27, and operates in the same manner to push out the lead as heretofore described. The locking ball 28 is located within the ball race, and when it comes in contact with the end of the tube 27 where it projects into the race, serves as a stop to prevent the ring 22 from being turned too far. The case point and other parts of this modification are identical with those already described.

In some cases, I may put a series of balls in the ball race, enough to completely fill the race and extend into the tube 6 or 27. In this case, the wire 14 or 26 will be correspondingly shorter and stiffer. This slight change is so obvious that illustration thereof is deemed unnecessary.

From the foregoing, it will be seen that I have provided a simple form of lead ejecting means for a magazine pencil case, wherein no screw action or sliding mechanism is utilized for the initial actuating mechanism. While the initial motion is rotary in each modification, yet that rotary motion is at once transformed into a rectilinear movement of the wire.

When it is desired to return the lead 16 to the case point 2, after using the pencil, it is only necessary to press it perpendicularly against any hard surface, when it will push the parts ahead of it and thus be returned to the case point, ready to be again ejected by the manipulation of the disk 9 or the ring 22, as the case may be.

I claim:—

1. In a magazine pencil, the combination of a tubular case and case point, means secured to the end of said case for ejecting a lead from said point comprising a fixed member and a movable member, said members having a ball race between them, balls in said race, and a flexible wire extending into said race and in alignment with a lead held in said point whereby movement of said movable member will cause one of said balls to push said wire endwise against said lead to eject the same from said case point.

2. In a magazine pencil, the combination of a tubular case, a fixed head upon said case, a rotatable member upon said head, a flexible member leading from said head through said case, and means upon said rotatable member for engaging the end of said flexible member to force it in the direction of its length and thereby eject a pencil point or lead from said case.

3. In a magazine pencil, the combination of a tubular case, a fixed head upon said case, a rotatable member upon said head, a circular ball race jointly formed in said head and said member, a guiding tube inserted through said head and extending tangentially into said race, a plurality of balls in said race for locking said rotatable member to said head, a wire extending through said tube into said race, and means upon said rotatable member for pushing said wire endwise through said tube to eject a lead from said case.

4. In a magazine pencil, the combination of a tubular case, a case point at one end thereof and a circular head at the other end thereof, a circular member associated with said head, a channel jointly formed in said head and said member, means in said channel for locking said member to said head against displacement, a guiding tube leading tangentially from said channel axially through said case and into said point, a flexible wire extending through said tube into said channel, and means actuated by the rotation of said circular member to force said wire endwise through said tube to eject a lead from said case point.

5. In a magazine pencil, the combination of a tubular case, a case point detachably connected therewith at one end thereof, a fixed annular head upon the other end of said case, a rotatable disk located in said annular head, an annular channel between the periphery of said disk and said head, a tube leading tangentially from said channel axially through said case and into said point, a flexible wire extending through said tube and into said channel and a pin projecting from the periphery of said disk into said channel for engaging the end of said wire to project the same endwise through said tube upon the rotation of said disk, whereby a lead held in said case point may be ejected therefrom.

6. In a magazine pencil, the combination of a tubular case, having a detachable point at one end and a fixed annular head at the other end thereof, a rotatable disk located within said annular head, a tube leading tangentially from said head axially through said case and into said point, a wire extending through said tube, and a projection upon said disk for engaging the end of said wire to project the same endwise through said tube to eject a lead from said case point.

7. In a magazine pencil, the combination of a tubular pencil case having a detachable point at one end and a rotatable member mounted upon the other end thereof, a guiding tube located in the axis of said case, a wire in said tube, and a pin upon said rotatable member for forcing said wire endwise through said tube when said member is rotated, to eject a lead from said point.

8. Means for ejecting the lead from a magazine pencil, comprising an annular member and a disk member, a ball race between said members, balls in said race for locking said members against relative disengagement, a tangential aperture leading from said race through one of said members, and a pin extending radially into said race from the other member to engage one of said balls, whereby the rotation of said latter member will cause said wire to be projected endwise through said aperture.

9. Means for ejecting the lead from a magazine pencil, comprising an annular member, and a disk member fitted to rotate within said annular member, a channel located jointly between said members, an aperture extending tangentially from said channel through one of said members, a pin extending into said channel from the other member, and a wire extending through said aperture into said channel, whereby the relative rotation of said members will cause said wire to be projected through said aperture.

ANTHONY VASSELLI.